Figure 1:
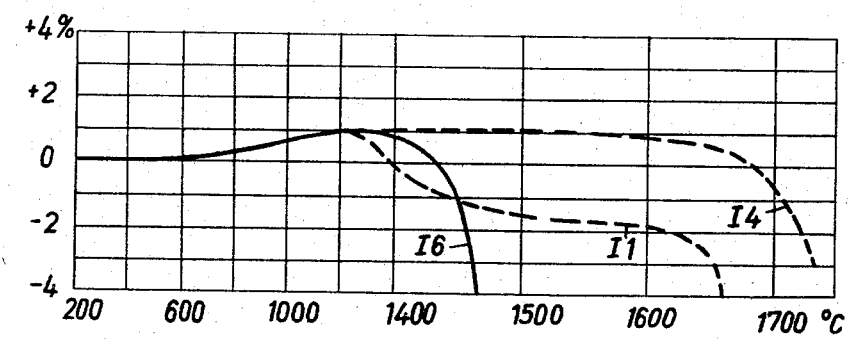

May 23, 1967     H. ABRECHT ET AL     3,321,321

FIRED REFRACTORY SHAPE AND PROCESS FOR ITS MANUFACTURE

Filed Feb. 5, 1965

Inventors
Hans ABRECHT
Janos LUKACS

United States Patent Office 3,321,321
Patented May 23, 1967

3,321,321
FIRED REFRACTORY SHAPE AND PROCESS FOR ITS MANUFACTURE
Hans Abrecht, Basel, Switzerland, and Janos Lukacs, Tiengen, Baden, Germany, assignors to Lonza-Werke Elektrochemische Fabriken GmbH, Weil am Rhine, Germany
Filed Feb. 5, 1965, Ser. No. 430,605
Claims priority, application Switzerland, Feb. 13, 1964, 1,717/64; Nov. 4, 1964, 14,260/64
9 Claims. (Cl. 106—57)

This invention, generally, relates to ceramics and is particularly directed to novel, ceramically bonded refractory shapes and a method for their manufacture.

It is a primary object of this invention to provide for a ceramically bonded refractory shape which has superior characteristics in respect to its refractoriness, resistance to oxidation, capability to withstand temperature changes and resistance to hot load strength deformation at high temperatures.

Another object of this invention is to provide for a method for producing refractory shapes having the superior qualities referred to, which method is simple to carry out without elaborate equipment.

Generally, it is an object of this invention to improve on the refractory art as presently practiced.

Briefly, and in accordance with this invention, a ceramically bonded refractory shape of superior quality is obtained by firing a mixture of (a) a ceramic material,
(b) a binder, whose primary constituents are aluminum oxide and silicon dioxide, and
(c) particulate metallic silicon.

In accordance with the invention, the amount of metallic silicon in the mixture should be about between 1 to 30 percent by weight, calculated on the amount of binder in the mixture. The amount of binder, in turn, should be between about 5 to 50 percent by weight, preferably about 20 percent by weight of the mixture to be fired.

The term "ceramic material" as used herein refers to silicon carbide and alumina and zirconia. The term "alumina," in turn, includes fire clay (chamotte), mullite, sillimanite, cyanite, alumina (calcined, hydrated) and corundum. The term "zirconia" as used herein includes zirconia proper, zirconium dioxide and zirconium silicate.

Preferred binders for the purposes of this invention are refractory clay, that is, clay containing more than 20 percent by weight of aluminum oxide and clay enriched with alumina.

Refractory shapes manufactured in accordance with this invention are eminently suitable for use as furnace linings, crucibles and the like purposes wherein materials are subjected to extreme heat treatment.

As is known, the technical utility of such ceramically bonded refractory shapes is primarily dependent on the refractoriness, oxidation resistance, capability to withstand temperature changes and, particularly, the resistance to softening upon application of pressure at high temperatures, a characteristic generally referred to as resistance to hot load strength deformation.

Extensive tests have conclusively demonstrated that the refractory shapes or bodies manufactured by firing a mixture of the indicated kind have superior characteristics in respect to the properties referred to, particularly in respect to their resistance to hot load strength deformation.

The beneficial effects of the invention are predicated on the presence of 1 to 30 percent by weight of particulate metallic silicon, calculated on the amount of binder in the mixture, the binder containing as main components aluminum oxide and silicon dioxide.

The tests have shown that refractory shapes produced by firing the indicated mixture have greatly increased capability to withstand temperature changes as compared to known refractory shapes devoid of metallic silicon. In particular, however, the hot load strength deformation characteristics are considerably improved at high temperatures. The resistance to oxidation is particularly pronounced.

Applicants do not want to be restricted by any theories advanced by them, but it is assumed that the beneficial effect of this invention is primarily predicated on the presence of the metallic silicon which, upon firing, binds the oxygen of at least one of the oxides contained in the binder so that, after the firing, the respective oxide is no longer present in that valency form which corresponds to the highest valency form saturated with oxygen.

Pursuant to this invention, the metallic silicon may be first mixed with the binder, whereafter the thus enriched binder is mixed with the ceramic material. However, it is also feasible to add the metallic silicon during the mixing of all of the components. The grain size of the particulate metallic silicon should be between about 0.0001 to 5 mm., preferably 0.005 to 0.1 mm.

The firing of the mixture in the presence of the metallic silicon addition is advantageously carried out in a temperature range of from about 1000 to 1800° C. A preferred temperature range is 1200 to 1500° C. The firing should be performed in a neutral or inert atmosphere for between about 1 to 20 hours, preferably for 2 to 8 hours. Prior to firing, the mixture is shaped into the desired configuration and is advantageously coated with engobe.

As previously mentioned, refractory clay, that is, clay containing at least 20 percent by weight of aluminum oxide is a suitable binder material for the purposes of this invention. Clay enriched with alumina is also suitable.

The invention will now be described by several tests, it being understood, however, that these tests are given by way of illustration and not by way of limitation and that many changes may be effected without affecting in any way the scope and spirit of this invention as recited in the appended claims.

The tests to be described hereinbelow were performed on ceramically bonded silicon carbide, mullite and corundum bodies, respectively. The hot load strength percent deformation of the bodies at elevated temperatures is represented in the graphs of FIGS. 1, 2 and 3.

Figure 2:
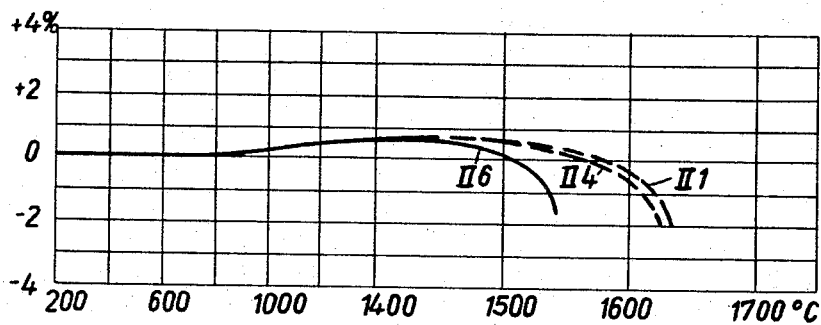
Figure 3:
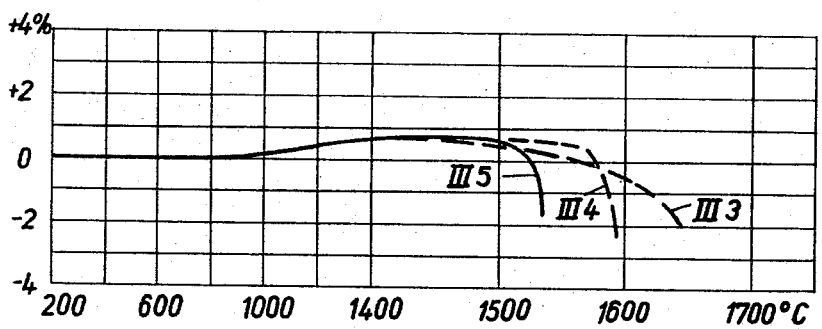

Thus, in the accompanying drawings, FIGS. 1, 2 and 3 represent graphs showing the hot load deformation characteristics of test shapes at constant pressure as a function of the temperature.

Three groups of test shapes were prepared. Each test shape contained 20 parts by weight of ceramic binder of a composition defined hereinbelow in Table I and 80 parts by weight of the ceramic material proper. In Group I, the ceramic material was green silicon carbide; in Group II, mullite; and in Group III, corundum. The components of the mixture had a grain size of from 0.075 to 0.08 mm. The mixture of the components thus defined was compacted into cylindrical test bodies of 50 mm. diameter and 50 mm. length and these cylindrical shapes or bodies were coated with an engobe consisting of 80 percent by weight of calcined alumina, 10 percent by weight of kaolin and 10 percent by weight of feldspar. The firing was carried out at a temperature of about 1500° C. in an inert atmosphere for about five hours.

Ceramic binders of six different compositions were used in preparing the test shapes referred to above. The composition of the different binders is tabulated in the following Table I, the different binders being indicated by the numerals 1 through 6.

TABLE I.—COMPOSITION OF BINDER

| No. | Al$_2$O$_3$, percent | SiO$_2$, percent | Si, percent |
|---|---|---|---|
| 1 | 60 | 35 | 5 |
| 2 | 64 | 24 | 12 |
| 3 | 54 | 31 | 15 |
| 4 | 60 | 23 | 17 |
| 5 | 63 | 37 | |
| 6 | 72 | 28 | |

As will be observed from Table I, each binder contained aluminum oxide (Al$_2$O$_3$) and silicon dioxide (SiO$_2$). Binders 1 through 4 contained moreover metallic silicon (Si) pursuant to this invention. Binders 5 and 6, however, were devoid of the inventive silicon addition. Thus, the test shapes containing binders 5 and 6 were used for control purposes.

Each test shape referred to hereinafter is indicated by two numerals. The first numeral, to wit, I, II or III indicates whether the ceramic material proper pertains to Group I, Group II or Group III, to wit, is silicon carbide, mullite, or corundum, respectively. The second numeral corresponds to the number of the binder according to Table I.

*Resistance to oxidation*

In order to test the oxidation resistance, the test shapes were cut into two halves along their center plane, whereby two cylinders with fresh cut surfaces and having a diameter of about 50 mm. were obtained. The two cylinders were then inserted into a Tamman furnace operated at a temperature of 1500° C. with the freshly cut surfaces pointing downwardly. The Tamman furnace contained oxygen so that the test cylinders were annealed or calcined at the temperature indicated in an oxygen atmosphere. The weight increase of the cylinders was determined after ten and 30 hours heat treatment, respectively. The results of this test are represented in Table II in which the percentage of silicon addition to the binder is the same as in Table I.

TABLE II.—OXIDATION RESISTANCE

| Silicon carbide test shape No. | Binder pursuant to Table I | Si, percent | Weight increase in percent after— | |
|---|---|---|---|---|
| | | | 10 hours | 30 hours |
| I1 | 1 | 5 | 4.81 | 6.42 |
| I2 | 2 | 12 | 2.37 | 3.21 |
| I3 | 3 | 15 | 2.03 | 3.21 |
| I4 | 4 | 17 | 1.80 | 2.07 |
| I5 | 5 | | 5.68 | 9.36 |
| I6 | 6 | | 5.72 | 8.82 |

The indicated weight increase figures are average values of two tests. The table clearly shows that the test shapes containing the inventive silicon addition, to wit, test shapes I1, I2, I3 and I4 exhibit considerably less weight increase. This means that they were oxidized to a lesser extent than the test bodies or shapes which did not contain the inventive silicon addition (shapes I5 and I6).

No tests were effected in respect to the shapes in which the ceramic material proper consisted of mullite or corundum, since such shapes are oxidation resistant per se.

*Capability to withstand temperature changes*

In order to test the above characteristics, the test bodies were annealed during 15 minutes at 1300° C., were subsequently quenched for 3 minutes in running water of about 12° C. temperature and were then dried for about 15 minutes in a drying oven at a temperature of about 110° C. The annealing, quenching and drying was cyclically repeated until the first cracks or fissures could be observed in the bodies. The number of cycles necessary to cause the first cracks or fissures is indicated as the quenching number in Table III which indicates the maximum and the average value of four tests of the indicated kind.

TABLE III.—CAPABILITY TO WITHSTAND TEMPERATURE CHANGES

| Test shape No. | Kind | Binder No. pursuant to Table I | Si, percent | Quenching number | | |
|---|---|---|---|---|---|---|
| | | | | Min. | Max. | Average Value |
| I1 | Silicon carbide | 1 | 5 | 45 | 61 | 53 |
| I2 | do | 2 | 12 | 50 | 77 | 65 |
| I3 | do | 3 | 15 | 74 | 87 | 79 |
| I4 | do | 4 | 17 | 90 | 130 | 108 |
| I5 | do | 5 | | 23 | 32 | 30 |
| I6 | do | 6 | | 27 | 38 | 34 |
| II1 | Mullite | 1 | 5 | 27 | 38 | 34 |
| II2 | do | 2 | 12 | 27 | 45 | 38 |
| II3 | do | 3 | 15 | 44 | 52 | 47 |
| II4 | do | 4 | 17 | 47 | 75 | 67 |
| II5 | do | 5 | | 15 | 20 | 18 |
| II6 | do | 6 | | 17 | 26 | 21 |
| III1 | Corundum | 1 | 5 | 24 | 36 | 29 |
| III2 | do | 2 | 12 | 28 | 40 | 35 |
| III3 | do | 3 | 15 | 38 | 47 | 44 |
| III4 | do | 4 | 17 | 42 | 68 | 60 |
| III5 | do | 5 | | 12 | 18 | 16 |
| III6 | do | 6 | | 14 | 26 | 22 |

Table III convincingly demonstrates that the quenching number of the inventive test shapes is up to 3.5 times as great as that of the prior art test shapes lacking the inventive silicon addition.

*Hot load strength percent deformation*

The test bodies were subjected to axial pressure of 2 kg./cm.$^2$ at slowly increasing temperature and the longitudinal length change was measured in dependence on the temperature. The characteristic results are plotted in the graphs. FIG. 1 illustrates the results for the silicon carbide test shapes, FIG. 2 for the mullite shapes, and FIG. 3 for the corundum shapes. Each graph is associated with a test shape having a binder mixture of numbers 1–6 as explained above. As can be seen, the softening temperature of shapes I1, I4, II1, II4, III3 and III4, wherein the binder contains the silicon addition, is substantially higher. In respect to the silicon carbide shapes, the temperature is several hundred degrees higher than that of the test shapes I6, II6 and III5, respectively, which represents the control test shapes devoid of silicon.

While specific embodiments of the invention have been shown and described in detail to illustrate the application of the inventive principles, it will be understood that the invention may be embodied otherwise without departing from such principles.

What is claimed is:

1. A fired, ceramically bonded refractory shape obtained by firing in an inert atmosphere a mixture of (a) 50–95 percent by weight of ceramic material selected from the group consisting of silicon carbide, mullite, fine clay, sillimanite, cyanite, zirconium dioxide, zirconium silicate and corundum; and (b) 5–50 percent by weight of a binder essentially consisting of refractory clay containing at least 20 percent by weight of aluminum oxide and metallic silicon, the amount of metallic silicon in the binder being about 1–30 percent by weight calculated on the amount of binder.

2. A refractory shape as claimed in claim 1, wherein the amount of binder in the mixture is about 20 percent.

3. A fired, ceramically bonded refractory as claimed in claim 1, wherein the mixture contains about 80 parts by weight of said ceramic material and about 20 parts by weight of said binder.

4. A refractory shape as claimed in claim 1, wherein the metallic silicon in the mixture has a grain size of about between 0.0001–5 mm.

5. In a process of producing a fired, ceramically bonded refractory shape, wherein 50–95 percent by weight of a ceramic material, selected from the group consisting of silicon carbide, mullite, fire clay, sillimanite, cyanite, zirconium dioxide, zirconium silicate and corundum, is fired an inert atmosphere in admixture with 5–50 percent by weight of a binder which essentially consists of refractory clay containing at least 20 percent by weight of aluminum oxide, the improvement which consists of first admixing the binder with particulate metallic silicon in an amount corresponding to about 1–30 percent by weight, calculated on the amount of binder.

6. The process of claim 5, wherein the metallic silicon has a grain size of about between 0.0001–5 mm.

7. The process of claim 5, wherein the firing is performed at about between 1000–1800° C.

8. A process of producing a fired, ceramically bonded refractory shape, which comprises preparing a mixture of (a) 50–95 percent by weight of a ceramic material selected from the group consisting of silicon carbide, mullite, fire clay, sillimanite, cyanite, zirconium dioxide, zirconium silicate and corundum; and (b) 5–50 percent by weight of a binder essentially consisting of refractory clay containing at least 20 percent by weight of aluminum oxide and particulate metallic silicon of a grain size of about between 0.0001–5 mm., the amount of silicon in the mixture corresponding to about 1–30 percent by weight calculated on the amount of binder, forming the mixture into a shape and firing the shape in an inert atmosphere at a temperature of about between 1000–1800° C.

9. The process of claim 8, wherein the amount of binder in the mixture is about 20 percent.

References Cited by the Examiner

UNITED STATES PATENTS 2,272,038    2/1942    Morgan _____ 106—44

TOBIAS E. LEVOW, *Primary Examiner.*

HELEN M. McCARTHY, *Examiner.*

J. E. POER, *Assistant Examiner.*